US008428363B2

United States Patent
Tuzel et al.

(10) Patent No.: US 8,428,363 B2
(45) Date of Patent: Apr. 23, 2013

(54) METHOD FOR SEGMENTING IMAGES USING SUPERPIXELS AND ENTROPY RATE CLUSTERING

(75) Inventors: Cuneyt Oncel Tuzel, Cambridge, MA (US); Srikumar Ramalingam, Cambridge, MA (US); Ming-Yu Liu, College Park, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 12 days.

(21) Appl. No.: 13/097,551

(22) Filed: Apr. 29, 2011

(65) Prior Publication Data

US 2012/0275702 A1 Nov. 1, 2012

(51) Int. Cl.
*G06K 9/48* (2006.01)
(52) U.S. Cl.
USPC .......................................... 382/199; 382/173

(58) Field of Classification Search .................. 382/173, 382/199
See application file for complete search history.

(56) References Cited

PUBLICATIONS

O.J. Morris et al, Graph theory for image analysis: an approach based on the shortest spanning tree, IEEE 1986.*

* cited by examiner

*Primary Examiner* — Chan S Park
*Assistant Examiner* — Mark Roz
(74) *Attorney, Agent, or Firm* — Dirk Brinkman; Gene Vinokur (57) ABSTRACT

An image is segmented into superpixels by constructing a graph with vertices connected by edges, wherein each vertex corresponds to a pixel in the image, and each edge is associated with a weight indicating a similarity of the corresponding pixels, A subset of edges in the graph are selected to segment the graph into subgraphs, wherein the selecting maximizes an objective function based on an entropy rate and a balancing term. The edges with maximum gains are added to the graph until a number of subgraphs is equal to some threshold.

14 Claims, 6 Drawing Sheets

Data: $G = (V, E)$ $w : E \to \mathbb{R}^+$, $K$ and $\lambda$
Result: $A$
begin

$A \leftarrow \emptyset$
for $\mathcal{N}(A) > K$ do

$\quad a := \underset{a \in E_i\{a\} \cup A \in \mathcal{I}}{arg\,max} \quad \mathcal{F}(A \cup \{a\}) - \mathcal{F}(A)$ $\quad A \to A \cup \{a\}$

METHOD FOR SEGMENTING IMAGES USING SUPERPIXELS AND ENTROPY RATE CLUSTERING

FIELD OF THE INVENTION

This invention related generally to segmenting pixels, and more particularly to segmenting images using superpixels.

BACKGROUND OF THE INVENTION

Generally in the art, a superpixel is a polygonal cluster of pixels in a digital image, larger than a single pixel, which can be rendered in the same color and brightness, see U.S. Pat. No. 7,744,185

Superpixel segmentation is used in object recognition, image segmentation, and 3D reconstruction applications. One major advantage of using superpixels is computational efficiency. Superpixel representation greatly reduces the number of image primitives required, when compared with pixel representation.

For example, in an L-label labeling problem, the solution space for pixel representation is $L^n$ where n is the number of pixels, typically $10^6$. However, the solution space for superpixel representation is $L^m$ where m is the number of superpixels, typically $10^2$.

It is commonly assumed that a superpixel is a set of pixels from a single object. This leads to a practical definition of superpixel segmentation, which pixels partitions in images into perceptually consistent clusters. The perceptual consistent property implies superpixel boundaries preserve object boundaries.

Most clustering processes can be characterized as superpixel segmentation. However, most of conventional processes model general aspects of clusters, and are not optimized for superpixel segmentation. Besides, many processes require intensive computations, and are unsuitable for segmentations.

One method uses a graph-based superpixel segmentation. Images are mapped into a neighborhood graph. The method uses a boundary predicate to sequentially cut edges for constructing the superpixels. Although the method is fast, it produces superpixels with irregular shapes and sizes.

A mean-shift method is accurate for local variations, but it also suffers from the irregular superpixel problem, see U.S. Publication 20100284607.

Another method for superpixel segmentation is NCut, see U.S. Publication 20110013837. NCut, produces superpixels with similar size and compact shape. However, it is also computationally expensive requiring several minutes even for a moderate size image, e.g., 481×321 pixels.

TurboPixel is as an efficient alternative to achieve similar regularity. TurboPixel is based on evolving curve from seeds uniformly placed in the image. It uses various constraints during curve evolution to enforce superpixel regularity.

Graph cuts can be used to achieve regular superpixels through a dense patch assignment technique. In another method, the superpixel conforms to a regular grid using a probabilistic boundary map for defining cut cost. The objective used there allows isomorphism among images.

SUMMARY OF THE INVENTION

The embodiments of the invention provide a method for segmenting an image into superpixels using a clustering objective function. The objective function includes two components: an entropy rate of a random walk, and a balancing function. The entropy rate forms compact and homogeneous clusters, while the balancing function produces clusters with similar sizes.

For the clustering, we construct a graph where the data points and pair-wise similarities correspond to the vertices and edge weights respectively. We partition the graph by maximizing the objective function, subject to a matroid constraint.

We solve the objective function with a greedy process, and exploit submodularity and monotonicity of the objective function to prove a constant approximation bound.

DETAILED DESCRIPTION OF THE PREFERRED EMBODIMENT

Graph Representation

We use a conventional notation G=(V, E) for an undirected graph representing pixels in an image, where V is a vertex set corresponding to the pixels, and E is an edge set. The $i^{th}$ vertex of V is represented by $v_i$, and the edge connecting vertices $v_i$ and $v_j$ is represented by $e_{i,j}$. A weight function w gives the similarity between two vertices connected by an edge. In the undirected graph, the edge indices are interchangeable, $e_{i,j}=e_{j,i}$, and edge weights are symmetric, $w_{i,j}=w_{j,i}$.

Graph Partition

A graph partition S refers to a partitioning of the set V into disjoint subsets $S=\{S_1, S_2, \ldots, S_K\}$, such that $S_i \cap S_j = \emptyset$ for $i \neq j$, and $\cup_i S_i = V$. The graph partitioning is a subset selection problem. Our goal is to select a subset of edges A in the set E, such that the resulting graph (V, A) has K connected subgraphs (connected components). Each resulting subgraph corresponds to a superpixel.

Entropy

Entropy H measures an uncertainty of a random variable. Entropy of a discrete random variable X with a conditional probability mass function $p_X$ can be determined as $$H(X) = -\sum_{x \in \mathcal{X}} p_X(x) \log p_X(x) \quad (1)$$

where X is the support of the random variable X. The conditional entropy H(X|Y) quantifies the remaining uncertainty of the random variable X given that the value of a correlated random variable Y is known. It is defined as $$H(X \mid Y) = \sum_{y \in Y} p_Y(y) H(X \mid Y = y) = -\sum_{y \in Y} p_Y(y) \sum_{x \in \mathcal{X}} P_{X|Y}(x \mid y) \log p_{X|Y}(x \mid y) \quad (2)$$

where Y is the support of Y, and $p_{X|Y}$ is the conditional probability mass function.

Entropy Rate

The entropy rate quantifies uncertainty of a stochastic process $X = \{X_t, t \in T\}$ where T is an index set. For a discrete random process, the entropy rate is defined as an asymptotic measure $$H(X) = \lim_{t \to \infty} H(X_t \mid X_{t-1}, X_{t-2}, \ldots, X_1). \quad (3)$$

The entropy rate measures the remaining uncertainty of the random process after observing a previous past trajectory. For a stationary stochastic process, the limit in Eqn. 3 always exists. In the case of a stationary first-order Markov process, the entropy rate has the form $$\mathcal{H}(\chi) = \lim_{t \to \infty} H(X_t | X_{t-1}) = \lim_{t \to \infty} H(X_2 | X_1) = H(X_2 | X_1).$$

The first equality is due to the first-order Markov property, and the second equality is a consequence of stationarity. We omit the limit because $H(X_2|X_1)$ is time-independent.

Random Walk

Random walks are stochastic processes on graphs. Let $X = \{X_t, t \in T, X_t \in V\}$ be a random walk on the graph G=(V, E) with a nonnegative similarity measure w. The random walk X is a trajectory made of successive random jumps from vertex to vertex. We use a conventional construction. The transition probability from vertex $v_i$ to $v_j$ is proportional to the associated edge weight, and is defined as $$p_{i,j} = Pr(X_{t+1} = v_j \mid X_t = v_i) = \frac{w_{i,j}}{w_i} \quad (4)$$

where
$w_i = \sum_{k: e_{i,k} \in E} w_{i,k}$
is the sum of incident weights of $v_i$.

The stationary distribution is $$\mu = (\mu_1, \mu_2, \ldots, \mu_{|V|})' = \left(\frac{w_1}{w_T}, \frac{w_2}{w_T}, \ldots, \frac{w_{|V|}}{w_T}\right)' \quad (5)$$

where
$w_T = \sum_{i=1}^{|V|} w_i$
is a normalization constant.

The probability that the random walk on a particular vertex is proportional to the total incident weight on the vertex. For a disconnected graph, the stationary distribution is not unique. However, $\mu$ in Eqn. 5 is always a stationary distribution. It can be verified through $\mu = P^T \mu$, where $P = [p]_{i,j}$ is the transition matrix. The entropy rate of the random walk can be determined by applying Eqn. 2

$$H(X) = H(X_2 \mid X_1) = \sum_i \mu_i H(X_2 \mid X_1 = v_i) = \quad (6)$$

$$-\sum_i \mu_i \sum_j p_{i,j} \log p_{i,j} = -\sum_i \frac{w_i}{w_T} \sum_j \frac{w_{i,j}}{w_i} \log \frac{w_{i,j}}{w_i} =$$

$$-\sum_i \sum_j \frac{w_{i,j}}{w_T} \log \frac{w_{i,j}}{w_T} + \sum_i \frac{w_i}{w_T} \log \frac{w_i}{w_T}$$

Submodularity

We use a submodular function definition. Let E be a finite set. A set function F is submodular if $$F(A \cup \{a_1\}) - F(A) \geq F(A \cup \{a_1, a_2\}) - F(A \cup \{a_2\}) \quad (7)$$

for all
$A \subseteq E$, $a_1, a_2 \in E$ and $a_1, a_2 \notin A$.

This property has an alias as the diminishing return property, i.e., the impact of a module is less if used in a later stage.

Strictly Monotonically Increasing Set Function:

The set function F is strictly monotonically increasing if $$(F(A_1) < F(A_2)) F(A_1) \leq F(A_2) \text{ for all } A_1 \subseteq A_2.$$

Matroid

A matroid is an ordered pair M=(E, I) that includes a finite set E and a collection I of subsets of the set E satisfying the following three conditions:

$\emptyset \in \mathcal{I}$.

If $I' \in \mathcal{I}$ and $I' \subseteq I$, then $I' \in \mathcal{I}$.

If $I_1$ and $I_2$ are in $\mathcal{I}$ and $|I_1| < |I_2|$, then there is an element e of $I_2 - I_1$ such that $I_1 \cup e \in \mathcal{I}$.

Our objective function is monotonically increasing, and submodular. In order to show this, we describe the equivalent set functions for entropy rate and entropy. Maximizing a monotonically increasing submodular function is NP-hard. However, we formulate the graph partition problem using a matroid representation and prove that a simple greedy process yields a ½ approximation bound.

Entropy Rate Clustering

Graph Construction

We construct the connected graph G=(V, E) from an image with vertices denoting the pixels, and the edge weights denoting the pair-wise similarities given in the form of a similarity matrix. We also assume that every vertex of the graph has a self loop with zero weight. When selecting a subset of edges to partition the graph, the weights of the unselected edges are distributed back into the resulting graph. Loops are selected by default, and are not in the set E. For every edge that is not selected, we increase the edge weights of the loops of the associated vertices in such a way that the total incident weight for each vertex remains a constant.

Figure 1:
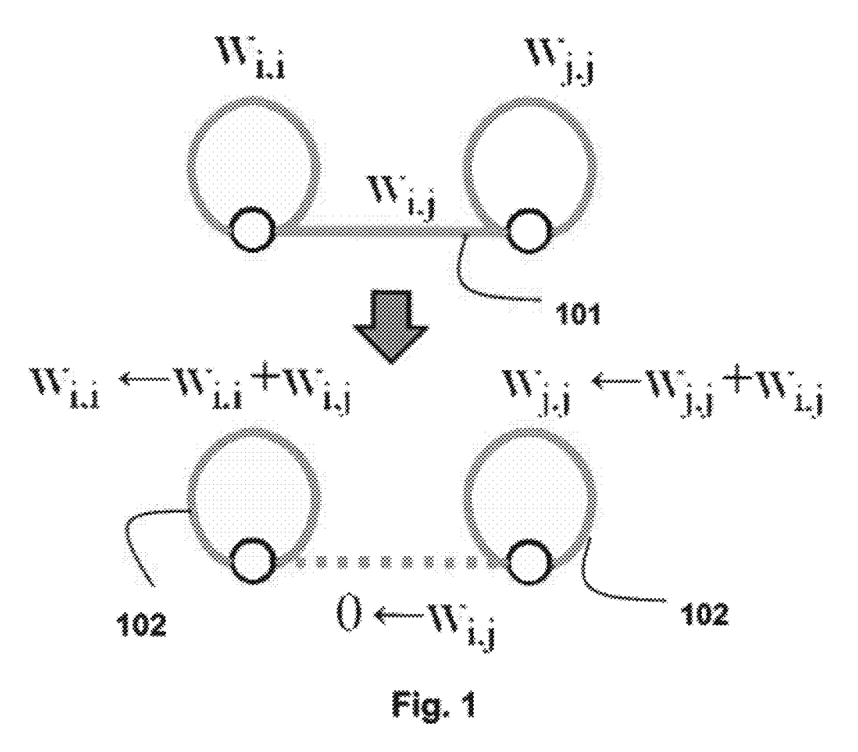
FIG. 1 is a schematic of constructing a connected graph according to some embodiments of the invention.

As shown in FIG. 1, if an edge $e_{i,j}$ 101 is unselected in cluster formation, the corresponding weight $w_{i,j}$ is redistributed to the loops of the two vertices 102.

This construction leaves Eqn. 5 unchanged. This is important for an iterative process where the edges are selected sequentially. Under this graph construction, the equivalent set function for transition probability $p_{i,j}$ $$p_{i,j}(A) = \begin{cases} \frac{w_{i,j}}{w_i} & \text{if } i \neq j \ \& \ e_{i,j} \in A, \\ 0 & \text{if } i \neq j \ \& \ e_{i,j} \notin A, \\ 1 - \frac{\sum_{j:e_{i,j} \in A} w_{i,j}}{w_i} & \text{if } i = j. \end{cases} \quad (8)$$

where A is the set of edges selected for partitioning. Consequently, the entropy rate of the random walk has an equivalent set function $$H(A) = -\sum_i \mu_i \sum_j p_{i,j}(A) \log(p_{i,j}(A)) \quad (9)$$

Entropy Rate

Figure 2A:
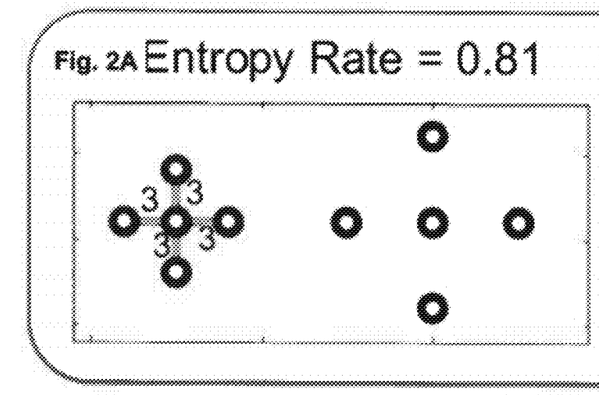
FIGS. 2A-2D are schematics of an entropy rate of a random walk on graphs as a criterion to obtain homogeneous and compact clusters according to some embodiments of the invention.
Figure 2B:
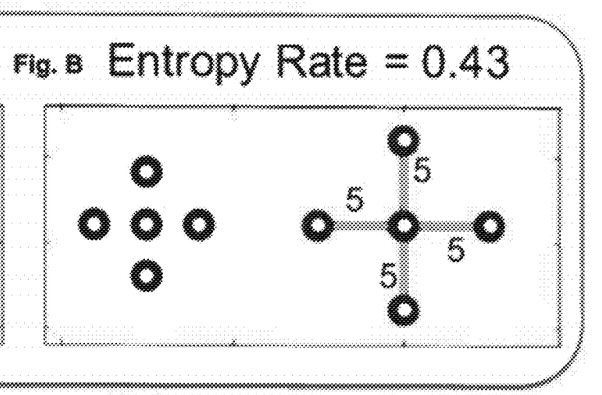
Figure 2C:
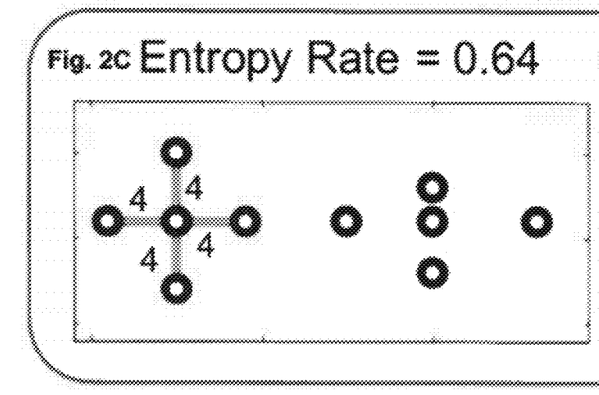
Figure 2D:
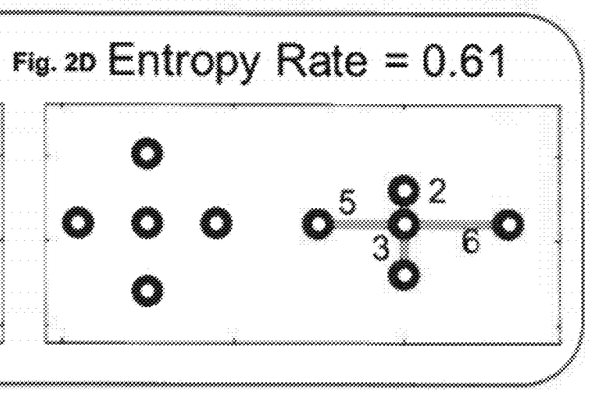

As shown in FIGS. 2A-2D, we use the entropy rate of the random walk on its associated graph as a criterion to obtain homogeneous and compact clusters. FIGS. 2A-2B correspond to one dataset, while FIGS. 2C-2D correspond to another dataset. Every vertex has a loop, which are not shown. The entropy rate of the compact cluster in FIG. 2A has a higher objective value than that of the less compact one in FIG. 2B. Entropy rate of the homogeneous cluster in FIG. 2C has a higher objective value than that of the less homogeneous one in FIG. 2D.

We use a Gaussian kernel to convert the distances to similarities. In each of these graph partitions, we have four different clusters shown as connected components. Homogeneous and compact clusters yield larger entropy rates. Although the selection of every edge increases the entropy rate by some value, the increase is larger when we select an edge from compact and homogeneous clusters.

The entropy rate of the random walk under the proposed graph construction is a monotonically increasing submodular function. Because the addition of an edge increases uncertainty, the entropy rate is monotonically increasing. The diminishing return property comes from the fact that the increase in uncertainty from selecting an edge is less in a later stage because it is shared with more edges.

Thus, the random walk on the graph $H: 2^E \to \Re$ is a monotonically increasing submodular function under our graph construction.

Balancing Function

We describe a balancing function that encourages clusters with similar sizes. Let A be the selected edge set, $N_A$ is the number of connected subgraphs in the graph, and $Z_A$ be the distribution of the cluster membership. For the partition $\{S_1, S_2, \ldots, S_{N_A}\}$, the distribution of $Z_A$ is equal to $$p_{Z_a}(i) = \frac{|S_i|}{|V|}, i = \{1, \ldots, N_A\}, \quad (10)$$

and the balancing term is given by $$B(A) \equiv H(Z_A) - N_A \quad (11)$$

$$= -\sum_i p_{Z_A}(i) \log(p_{Z_A}(i)) - N_A. \quad (12)$$

The entropy $H(Z_A)$ favors clusters with similar sizes; whereas $N_A$ favors fewer number of clusters.

Figure 3A:
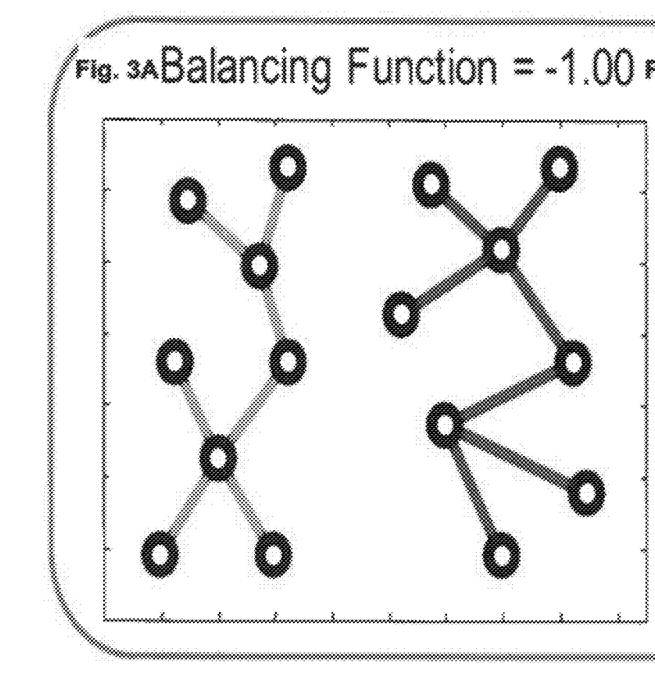
FIGS. 3A-3B are schematics of role of a balancing function for obtaining clusters of similar sizes according to some embodiments of the invention.
Figure 3B:
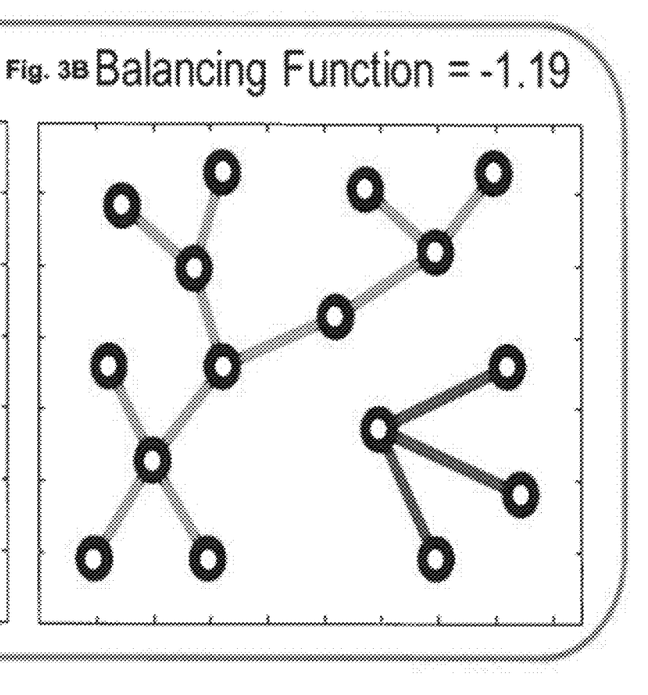

FIGS. 3A-3B show the role of a balancing function in obtaining clusters of similar sizes. The connected components show the different clusters in the dataset. The balancing function has a higher objective value for the balanced clustering in FIG. 3A, compared to the less balanced one in FIG. 3B.

Similar to the entropy rate, the balancing function is also a monotonically increasing submodular function.

We combine the entropy rate and balancing function, and solve the subset selection problem $$\max_{A \subseteq E: N(A) \geq K} H(A) + \lambda B(A) \quad (13)$$

for determining compact, homogeneous, and balanced clusters. The parameter $\lambda > 0$ in Eqn. 3 is the balancing weight, which is used to control the preference on balancing clustering.

Based on the above, the objective function $$\mathcal{F}(A) = \mathcal{H}(A) + \lambda B(A) \quad (14)$$

is a monotonically increasing submodular function. Because combining clusters results gain in balancing term, it is guarantees that there are exactly K clusters at all the local optima.

Greedy Heuristic

One process for maximizing a submodular set function uses a greedy process. The process starts with an empty set (a fully disconnected graph, $A = \emptyset$) and sequentially adds edges to the set. At each iteration, it adds the edge that yields the largest gain. The iterations are stopped when the number of connected subgraphs reaches a preset number, $N_A = K$.

In order to achieve additional speedup, we put an additional constraint on the edge set A such that it can not include cycles. This constraint immediately ignores additional edges within a connected subgraph and reduces the number of evaluations in the greedy search. These edges do not change the partitioning of the graph. Although this constraint leads to a smaller solution space (only tree-structure subgraphs are allowed) compared to the original problem, in practice the clustering results are very similar.

This cycle-free constraint, together with the cluster number constraint $N_A \geq K$, leads to an independent set definition which induces a matroid $M = (E, I)$. If edge E is the edge set, and the set of subsets A of E for which the edge set A is cycle-free is I, and constitutes a graph partition with a greater than or equal to K connected components, then the pair $M = (E, I)$ is a matroid.

Figure 4:
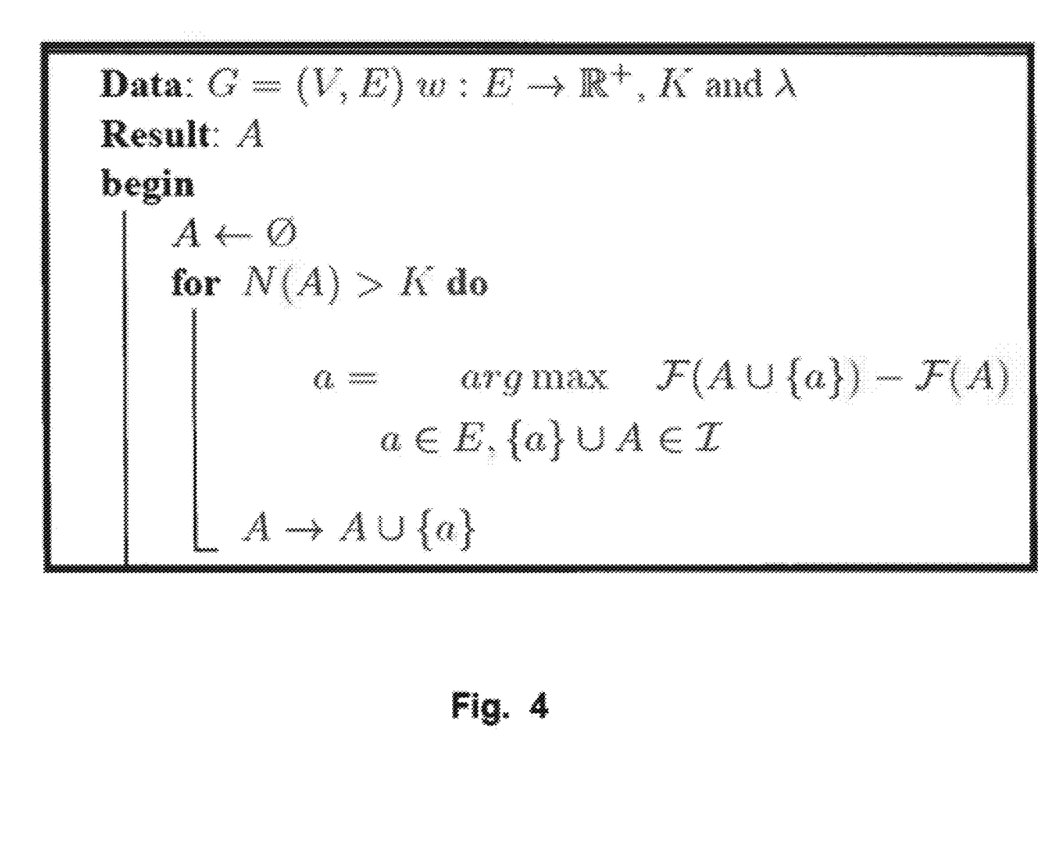
FIG. 4 is a block diagram of pseudo code for a solution a graph partitioning problem for a clustering function according to one embodiment of the invention.

The reformulation of the graph partition problem is $$\arg \max_{A \in I} H(A) + \lambda B(A). \quad (15)$$

and the algorithm for solution is shown in FIG. 4.

Because the greedy process gives a ½ approximation for maximizing a non-decreasing submodular function, subject to a matroid constraint, the process as shown in FIG. 4 shows a ½-approximation for solving Eqn. 15.

Efficient Implementation

Initially, we compute the gain of adding each edge to A and construct a heap. At each iteration, the edge with the maximum gain is removed from the heap and included to A. The inclusion of this edge affects the gains of some of the remaining edges in the heap. Therefore, the heap needs to be updated. However, the submodular property allows an efficient update of the heap structure. The key observation is that, throughout the i.e., the gain for each edge can never increase, e.i., a diminishing return property. Therefore, it is sufficient to keep a heap where the gain of the top element is updated but not necessarily the others. Because the top element of the heap is updated and the values for the other elements can only decrease, the top element is the maximum value.

In practice the process runs much faster than the naive implementation. On average, very few updates are performed on the heap at each iteration. In our experiments, it provides a speedup by a factor of 200-300 for image size 481×321.

Figure 6:
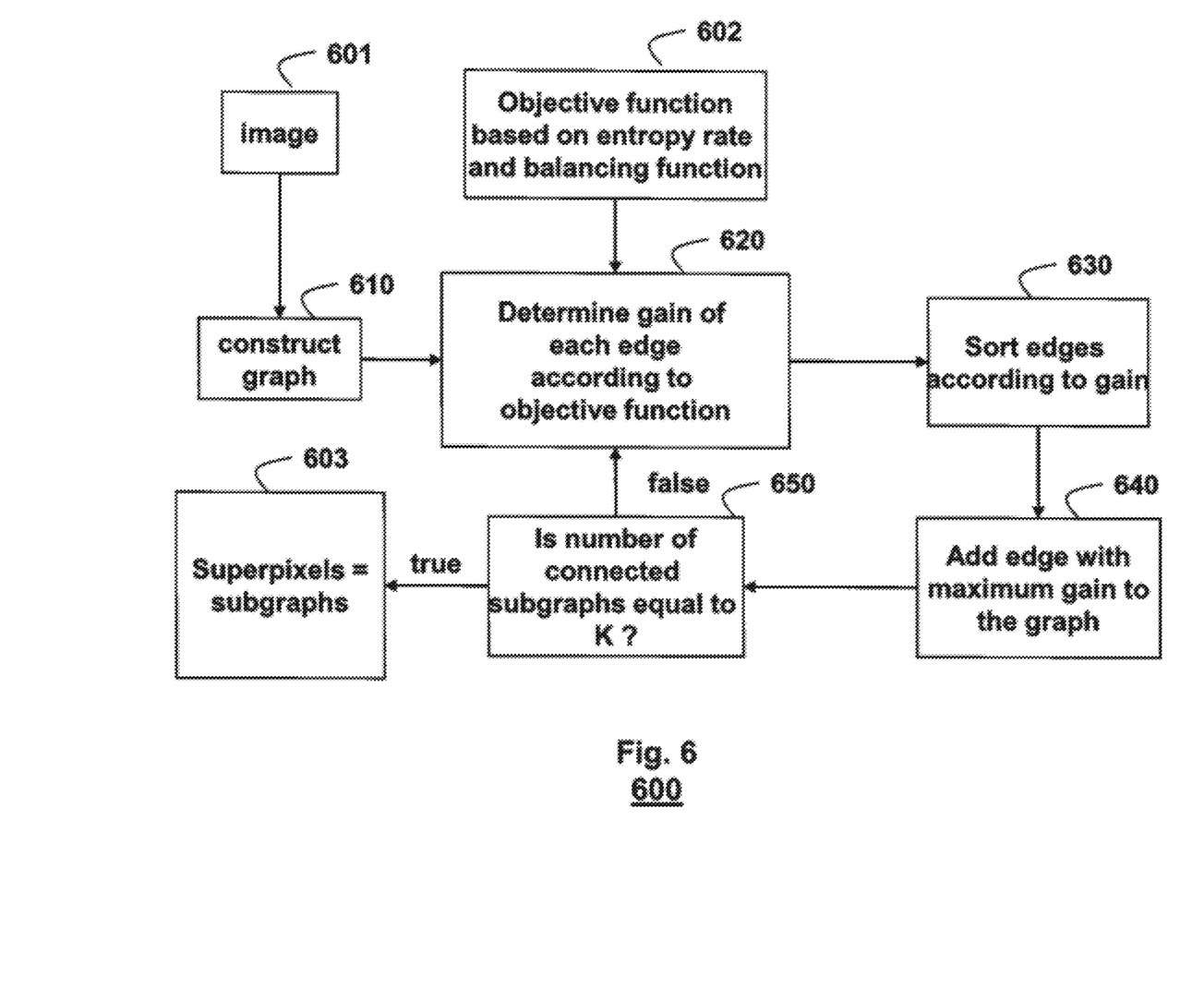
FIG. 6 is a flow diagram of a super pixel segmentation method according to embodiments of the invention.

FIG. 6 shows the basic steps of one embodiment of the invention. Input is an image 601. We construct 610 a graph with vertices connected by edges, wherein each vertex corresponds to a pixel in the image, and each edge is associated with a weight indicating a similarity of the corresponding pixels. Initially the graph does not include any edges. The objective function is maximized using a greedy process which sequentially adds edges to the graph.

We determine 620 the gains of adding each edge to the graph based on the objective function, which includes an entropy rate and a balancing term 602.

We sort 630 the edges according to the gain, and add 640 the edge with the maximum gain to the graph.

We determine if a number of connected subgraphs is equal to some threshold K. If false, repeat steps 620, 630 and 640. If true, we have the desired superpixels 603.

The steps of the method 600 can be performed on a processor connected to a memory and input output interfaces as known in the art.

Automatic Parameter Tuning

We describe a method to automatically adjust the balancing parameter $\lambda$. Given an initial user-specified value $\lambda'$, the final balancing parameter $\lambda$ is adjusted based on: (1) the number of superpixels K and (2) a data dependent dynamic parameter $\beta$ which is computed from the input image. The cluster number K is introduced for emphasizing more on the balancing term when large numbers of superpixels are required. The data dependent term is given by the ratio of the maximal entropy rate increase and the maximal balancing term increase upon including a single edge into the graph $$\beta = \frac{\max_{e_{i,j}} H(e_{i,j}) - H(\emptyset)}{\max_{e_{i,j}} B(e_{i,j}) - B(\emptyset)}$$

and compensates for the magnitude difference between the two terms in the objective function. The final balancing parameter is given by $\lambda = \beta K \lambda'$.

Superpixel Hierarchy

Figure 5:
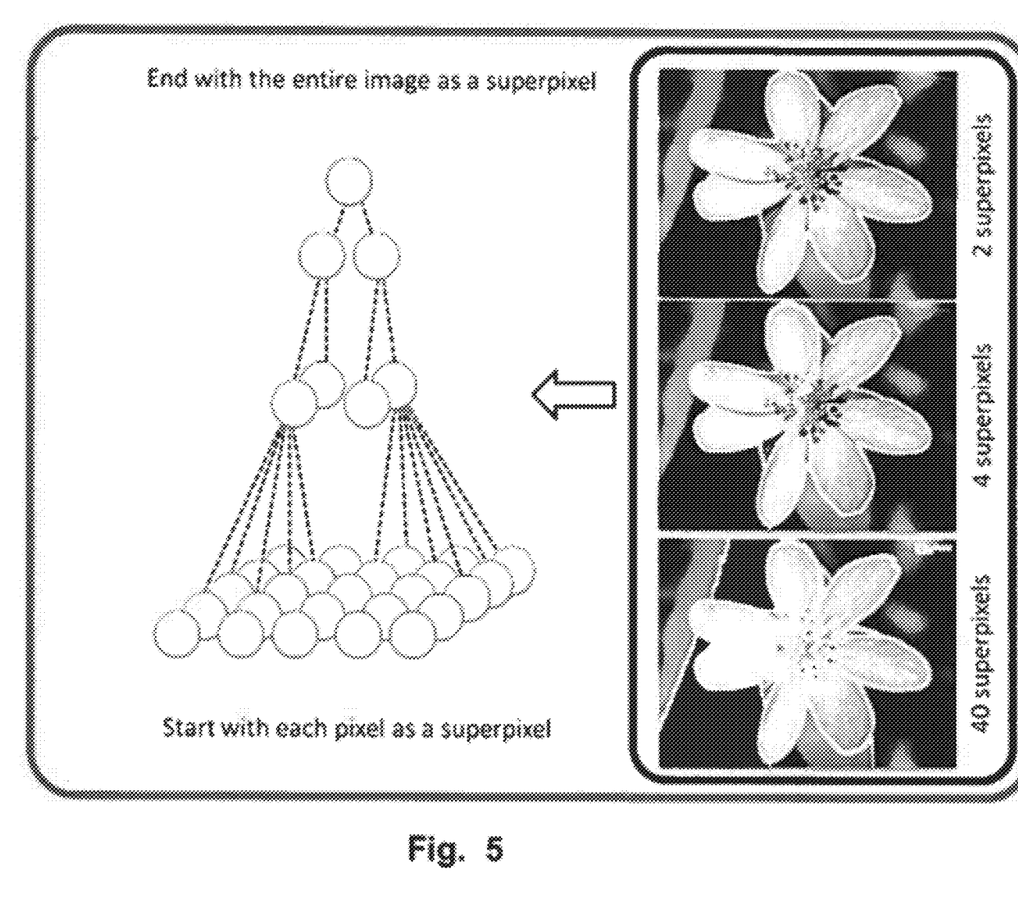
FIG. 5 is the schematic of a hierarchical super pixel segmentation process according to some embodiments of the invention.

The segmentation process starts with each pixel as a separate cluster and gradually combines clusters to construct larger superpixels. This segmentation hierarchy produces multiple segmentations of the image simultaneously. Based on the application the correct number of superpixels in the segmentation can be selected. FIG. 5 shows this agglomerative nature that generates a superpixel hierarchy during segmentation.

The hierarchy is useful for many vision applications such as interactive editing or algorithms that utilize information from multiple superpixel segmentations. After the initial segmentation is completed, the user can select specific superpixels and further merge or split these superpixels based on the hierarchy. This is important for interactive analysis such as medical segmentation where a superpixel might include multiple organs and the further grouping/segmentation of that superpixel produces separation of organs.

General Clustering

Although the invention has been described for image segmentation, the method applies to any clustering problem. Given a set of points instead of pixels of an image, the similarities between the points can be defined based on a distance metric. The same graph construction then applies to this general set of points where the points are the vertices of the graph and edges connect a point to its L nearest neighbors. The described algorithm produces clustering of this point set.

The domain of general clustering include but not restricted to data mining, finance, bioinformatics, medicine, neuroscience, etc.

EFFECT OF THE INVENTION

The invention provides a novel clustering objective for producing superpixels. The clustering objective is based on maximizing a combination entropy rate of a random walk on a graph, and a balancing function. We use submodularity of the objective function, and a matroid representation to solve the problem of maximizing the objective function with a greedy process.

Although the invention has been described by way of examples of embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for segmenting an image into superpixels, comprising the steps of:
constructing a graph with vertices connected by edges, wherein each vertex corresponds to a pixel in the image, and each edge is associated with a weight indicating a similarity of the corresponding pixels;
selecting a subset of edges in the graph to segment the graph into subgraphs, wherein the selecting maximizes an objective function, wherein the objective function is submodular and includes an entropy rate of a random walk on the graph to produce homogeneous superpixels and a balancing term including an entropy component of distribution of membership of segments maximizing a number of segments of similar sizes and a number of connected subgraphs component minimizing a number of segments; and
adding the edge with a maximum gain to the graph until a number of subgraphs is equal to a threshold, and repeating the selecting and adding steps if the number of subgraphs is below the threshold, wherein the steps are performed in a processor.

2. The method of claim 1, wherein each subgraph includes homogeneous and similar sized superpixels.

3. The method of claim 1, wherein the entropy rate is submodular and monotonically increasing.

4. The method of claim 1, wherein the balancing term is submodular and monotonically increasing.

5. The method of claim 1, wherein a constraint on a number of subgraphs in a cycle-free graph is a matroid.

6. The method of claim 1, objective function is maximized using a greedy process subject to a constraint.

7. The method of claim 1, wherein optimality is guaranteed to be ½ of a global minimum of the objective function.

8. The method of claim 7, wherein the greedy process is implemented using a heap structure.

9. The method of claim 1, wherein the segmentation is achieved hierarchically.

10. The method of claim 9, wherein the hierarchy forms multiple segmentations of the image simultaneously.

11. The method of claim 1, wherein a balancing parameter of the balancing term is tuned automatically.

12. The method of claim 1, wherein a balancing parameter of the balancing term is modified by user to customize segmentation.

13. The method of claim 1, wherein the segmentation is performed interactively with user supervision.

14. The method of claim 1, wherein general clustering problems in non-image domains are solved.

* * * * *